US010439921B1

(12) United States Patent
Dubey et al.

(10) Patent No.: US 10,439,921 B1
(45) Date of Patent: Oct. 8, 2019

(54) DETERMINING APPLICATION PERFORMANCE CHARACTERISITICS AND PROVIDING ON-DEVICE INDICATIONS THEREOF

(71) Applicant: Amazon Technologies, Inc., Seattle, WA (US)

(72) Inventors: Pradip Kumar Dubey, Chennai (IN); Aneesh Murugan, Chennai (IN); Rajasekar Chinnasamy, Chennai (IN)

(73) Assignee: Amazon Technologies, Inc., Seattle, WA (US)

( * ) Notice: Subject to any disclaimer, the term of this patent is extended or adjusted under 35 U.S.C. 154(b) by 408 days.

(21) Appl. No.: 14/946,219

(22) Filed: Nov. 19, 2015

(51) Int. Cl.
G06F 15/173 (2006.01)
H04L 12/26 (2006.01)
H04B 17/318 (2015.01)

(52) U.S. Cl.
CPC ........... H04L 43/16 (2013.01); H04B 17/318 (2015.01)

(58) Field of Classification Search
None
See application file for complete search history.

(56) References Cited

U.S. PATENT DOCUMENTS

| 9,585,037 B1 * | 2/2017 | Davari | H04W 24/08 |
| 2009/0082034 A1 * | 3/2009 | Gray | H04W 64/00 |
| | | | 455/456.1 |
| 2009/0303204 A1 * | 12/2009 | Nasiri | A63F 13/06 |
| | | | 345/184 |
| 2010/0094990 A1 * | 4/2010 | Ben-Yehuda | G06F 11/3409 |
| | | | 709/224 |
| 2014/0068516 A1 * | 3/2014 | Escobedo | G06F 3/04817 |
| | | | 715/835 |
| 2014/0089857 A1 * | 3/2014 | Wang | G06F 3/04817 |
| | | | 715/835 |
| 2014/0362713 A1 * | 12/2014 | Agarwal | H04W 24/08 |
| | | | 370/252 |
| 2015/0271779 A1 * | 9/2015 | Alavudin | H04W 64/003 |
| | | | 455/456.1 |
| 2016/0098337 A1 * | 4/2016 | Ekambaram | G06F 11/3409 |
| | | | 719/318 |
| 2016/0234092 A1 * | 8/2016 | Avery | H04L 43/16 |

* cited by examiner

*Primary Examiner* — Mohamed Ibrahim
(74) *Attorney, Agent, or Firm* — Eversheds Sutherland (US) LLP

(57) ABSTRACT

Systems, devices, methods, and computer-readable media are discussed herein for assessing performance characteristics of an application executable on a user device and providing an on-device indication of the performance characteristics prior to the application being launched. The on-device indication may take the form of a graphical indicator that provides a user with an indication of the level of performance to expect from the application after the application is launched. In this manner, a user may decide whether the expected level of performance of the application is acceptable to the user prior to actually launching the application.

19 Claims, 9 Drawing Sheets

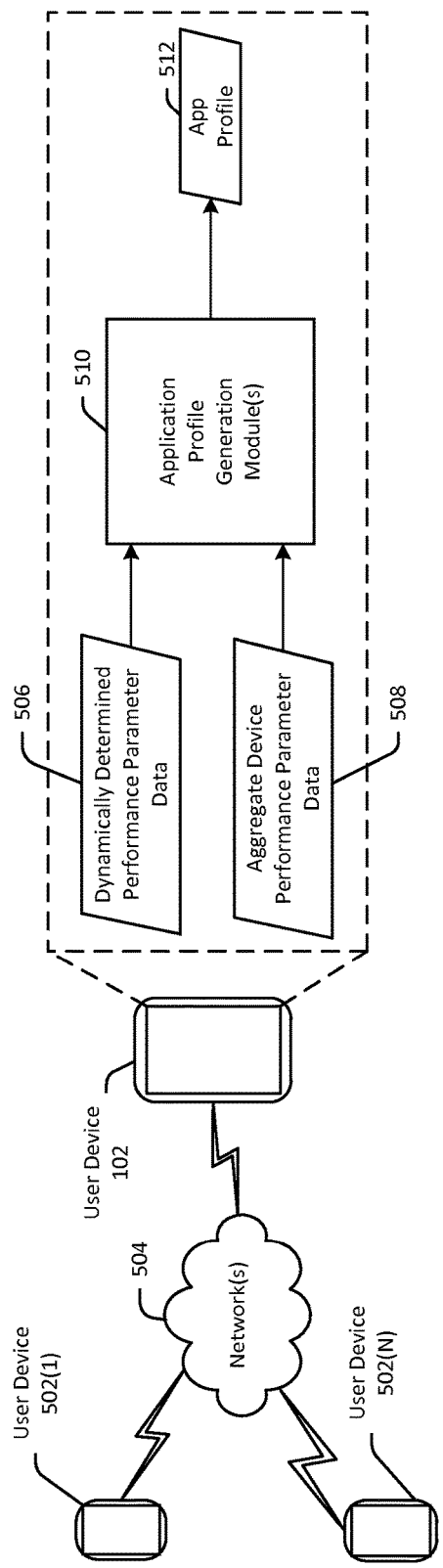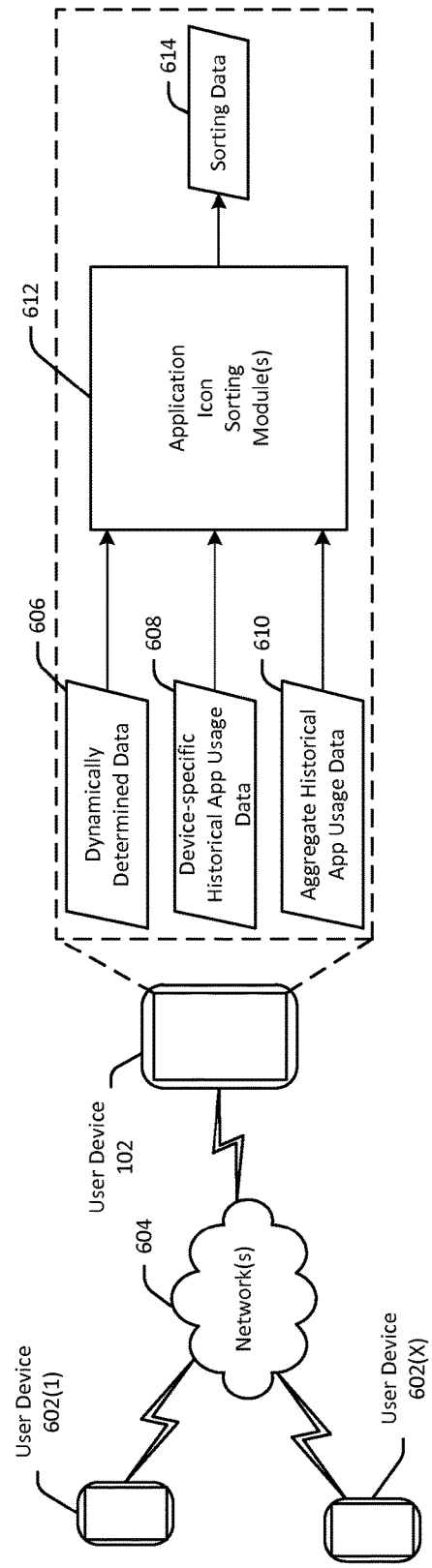

DETERMINING APPLICATION PERFORMANCE CHARACTERISITICS AND PROVIDING ON-DEVICE INDICATIONS THEREOF

BACKGROUND

A variety of mobile applications exist that enable various types of functionality. For example, a user may utilize a video streaming application on a mobile device (e.g., a smartphone, tablet, or the like) to stream video content. As another example, a user may utilize a navigation application to obtain directions and track the change in location of a user device from an origin location to a destination location. As still another example, a user may utilize a messaging application to send and receive electronic messages. Any given application may exhibit different performance characteristics at different times based on changes in network connectivity, available on-device memory, available processing capacity, or the like. Different performance characteristics may result in different user experiences when using an application. Further, prior to actually launching and using an application, a user may be unaware of the type of user experience that will result.

BRIEF DESCRIPTION OF DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily, the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIG. 5 depicts the generation of an application profile in accordance with one or more example embodiments of the disclosure.

FIG. 6 depicts the generation of application icon sorting data in accordance with one or more example embodiments of the disclosure.

DETAILED DESCRIPTION

Overview

Figure 1:
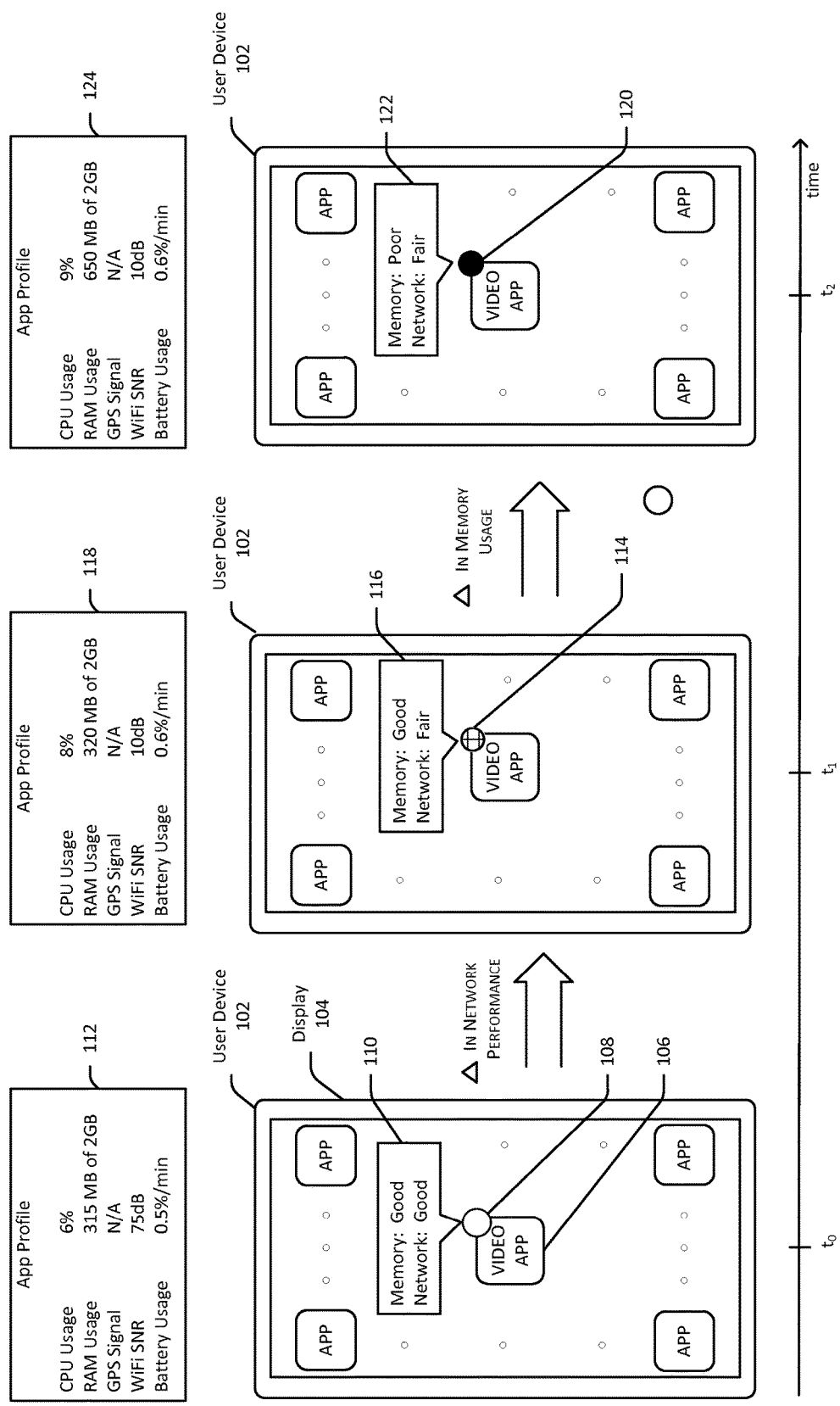
FIG. 1 depicts different graphical indicators being displayed on a user device in association with an icon that is representative of an executable application based on changes in performance data relating to application performance parameters associated with the executable application in accordance with one or more example embodiments of the disclosure.

This disclosure relates to, among other things, systems, devices, methods, and computer-readable media for assessing performance characteristics of an application executable on a user device and providing an on-device indication of the performance characteristics prior to the application being launched. The on-device indication may be a graphical indicator that provides a user with an indication of the level of performance to expect from the application after the application is launched. In this manner, a user may decide whether the expected level of performance of the application is acceptable to the user prior to actually launching and using the application.

Various performance parameters may be associated with an executable application such as a mobile application. Certain performance parameters may have a default association with each of multiple different executable applications. For example, a network connectivity parameter, a central processing unit (CPU) usage parameter, a memory usage parameter, and a battery usage parameter may be default performance parameters associated with each of multiple executable applications. Other performance parameter(s) may have a specific association with one or more executable applications. For example, a GPS signal parameter may be associated with a navigation application (e.g., a maps application) but not with a content streaming application (e.g., a video streaming application). Further, an association between a performance parameter and an executable application may be customizable. For example, a user may be able to specify one or more performance parameters to associate with a particular application.

A performance parameter may be associated with an application by storing an identifier of the performance parameter in a same data record as an identifier of the application or in a different data record that is linked to a data record in which the identifier of the application is stored. For example, an identifier of an application and an identifier of a performance parameter may be stored as a key-value pair. As another example, an identifier of an application and respective identifiers for one or more performance parameters may be stored as a JavaScript Object Notation (JSON) map. It should be appreciated that any suitable storage format, file, or underlying data structure may be used to associate performance parameter(s) with an application.

Respective performance data may be determined for each performance parameter associated with an application. For example, assuming that a network connectivity parameter, a GPS parameter, a CPU usage parameter, a memory usage parameter, and a battery usage parameter are associated with an application, respective performance data may be determined for each of these parameters.

The type of performance data that is determined may depend on the particular type of parameter. For example, for the CPU usage parameter, an amount of CPU processing capacity expected to be utilized to launch and execute functionality of the application may be determined. More particularly, the performance data for the CPU usage parameter may be expressed as a percentage of the CPU processing capacity expected to be allocated to launch and execute functionality of the application. As another example, for the memory usage parameter, an amount of memory expected to be utilized by the application after the application is launched may be determined. The expected amount of memory to be allocated to the application may be expressed in any suitable units (e.g., megabytes (MBs) of available random access memory (RAM)). As yet another example, for the battery usage parameter, an expected amount of battery power that will be consumed by executing functionality associated with the application may be determined. The performance data determined for the battery usage parameter may be expressed, for example, as a percentage of total battery capacity consumed per unit of time (e.g., 0.5%/min).

With respect to the network connectivity parameter, the performance data may include a signal strength of a network connection between a user device on which the application is to be launched and executed and another device. More particularly, for a WiFi connection between the user device and a wireless access point, for example, a signal strength of a radio frequency (RF) signal received by the user device from a transmitting antenna of the wireless access point may be determined. As another example, a signal strength of an RF signal transmitted across a Bluetooth connection between the user device and another device may be determined. The signal strength may be a measure of the magnitude of an electric field at a reference point (e.g., an antenna of the user device) that is some distance away from a transmitting antenna. The signal strength may be expressed in decibel-microvolts per meter (dBµV/m), decibels above a reference level of one milliwatt (dBm), or using any other suitable measurement. Other types of signal strength measurements may additionally, or alternatively, be determined in relation to the network connectivity parameter. For example, a received signal strength indicator (RSSI) value may be determined for a WiFi connection, a Bluetooth connection, or the like. An RSSI value may be a measurement that is indicative of the power present in a received RF signal. As another example, a signal-to-noise ratio (SNR) value may be determined for a network connection. It should be appreciated that the types of application performance parameters described herein and the types of corresponding performance data that may be determined are merely illustrative and not exhaustive.

The performance data determined for one or more application performance parameters may include data that is dynamically determined with respect to a particular device and/or historical performance data collected across an aggregate number of devices. For example, for the network connectivity parameter, a user device, or more specifically, one or more processing units of the user device executing one or more program modules, may periodically determine a signal strength (e.g., an RSSI value, an SNR value, etc.) of a signal received over a network connection between the user device and another device. Similarly, for the GPS signal parameter, the user device may periodically determine the strength of a GPS signal received by a GPS receiver of the user device.

Further, for any given application performance parameter, performance data may be collected from an aggregate number of devices. For example, for the CPU usage parameter, the memory usage parameter, and/or the battery usage parameter, historical usage data relating to these parameters and associated with execution of a respective instance of an application on each of any number of user devices may be collected over a period of time. This historical usage data may then be used as benchmark performance data for the application on a particular user device. This benchmark performance data may then be modified, supplemented, etc. using performance data dynamically determined on the particular user device. For example, historical performance data indicative of an average amount of memory allocated to an application may be collected from an aggregate number of devices. This historical performance data may be used as an initial estimate of the amount of memory likely to be allocated to the application when launched on a particular user device. As the application is launched and executed on the particular user device one or more times over a period of time, the actual amount of memory allocated to the application may be used to refine the initial estimate of memory allocation provided by the benchmark performance data.

An application profile may be generated for an application. The application profile may contain or be linked to performance data determined with respect to one or more application performance parameters associated with the application. The performance data contained in an application profile may be compared to various threshold values to determine an expected performance level of an application. Any given application performance parameter may be associated with multiple threshold values, which together may define multiple tiers of performance of the application with respect to that application performance parameter. For example, if a signal strength value meets or exceeds a first threshold value, it may be determined that the application is expected to perform at a highest level of performance with respect to the network connectivity parameter. Alternatively, if the signal strength value is less than a second threshold value, it may be determined that the application is expected to perform at a lowest level of performance with respect to the network connectivity parameter. One or more additional threshold values may define, at least in part, intermediate levels of performance of the application with respect to the network connectivity parameter. For example, if a signal strength value meets or exceeds the second threshold value but is less than the first threshold value, it may be determined that the application is expected to perform at an intermediate level of performance with respect to the network connectivity parameter. One or more threshold values may similarly be used to determine a performance level of an application with respect to any given application performance parameter.

An indication of the performance status (e.g., the expected performance level) of an application may be presented via a user device on which the application can be launched and executed. For example, a graphical indicator may be rendered on a display of the user device in proximity to an application icon that is rendered on the display and that is representative of the application. An intuitive color-coded scheme may be used to designate a performance status associated with a graphical indicator. For example, a "green" graphical indicator may indicate a performance status corresponding to an expected level of performance of the application that meets or exceeds a first threshold level of performance associated with a desirable user experience. A "red" graphical indicator may indicate a performance status corresponding to an expected level of performance of the application that meets or falls below a second threshold level of performance associated with an undesirable user experience. One or more graphical indicators indicative of intermediate levels of performance, and thus, intermediate user experiences, may also be displayed. For example, a "yellow" graphical indicator may indicate an expected level of performance of the application between the level of performance associated with the "green" graphical indicator and the level of performance associated with the "red" graphical indicator.

It should be appreciated that the color-coded scheme described above is merely an example implementation for providing on-device indications of the performance status associated with an application. As another example, text (e.g., a word or phrase) indicative of the performance status of an application may be displayed. For example, the text "good" or the like may be rendered in an overlay on a display of the user device in proximity to an application icon to indicate an expected level of performance of the application that meets or exceeds a first threshold level of performance associated with a desirable user experience. Alternatively, the text "poor" or the like may be rendered in an overlay on the display of the user device in proximity to the application icon to indicate an expected level of performance of the application that meets or falls below a second threshold level of performance associated with an undesirable user experience. Further, the text "fair" or the like may be rendered in an overlay on the display of the user device in proximity to the application icon to indicate an intermediate level of performance of the application.

While example embodiments in which graphical or text-based indications of a performance status of an application have been discussed above, in other example embodiments, an indicator of a performance status of an application may additionally, or alternatively, be provided by a user device in the form of audible output, haptic output, or the like. For example, upon detecting a touch event corresponding to selection of an application icon (or selection of a graphical indicator displayed in association with the application icon), the user device may output audio data that indicates the expected performance level of the application (e.g., audio data corresponding to the text "good"). The application may then be automatically launched or a subsequent user selection of the application icon may be required to launch the application. As another example, the user device may output different forms of haptic output to indicate different performance statuses of an application. For example, upon detecting a touch event corresponding to selection of an application icon (or selection of a graphical indicator displayed in association with the application icon), the user device may generate a haptic output indicative of the performance status of the application. As an example, a single device vibration may indicate a highest level of performance and multiple successive device vibrations may indicate lower levels of performance.

An application performance parameter may be designated as a critical application performance parameter for an application. For a critical application performance parameter, performance data relating thereto may be determinative of the performance status of an application, and thus, determinative of the indication of performance status that is output (e.g., the type of graphical indicator that is displayed). For example, if the network connectivity performance parameter is a critical application performance parameter for an application, and if a signal strength value meets or exceeds a first threshold value associated with a highest level of performance of the application, a graphical indicator indicative of the highest level of performance of the application (e.g., the "green" indicator in the color-coded scheme noted above) may be displayed regardless of whether performance data associated with other application performance parameter(s) indicates lower levels of performance. In other example embodiments, a combination of application performance parameters may together be designated as critical. For example, a graphical indicator indicative of the lowest level of performance of the application (e.g., the "red" indicator in the color-coded scheme noted above) may only be displayed if both a signal strength value corresponding to the network connectivity parameter meets or falls below a threshold value associated with a lowest level of performance of the application and expected memory to be allocated to the application meets or exceeds a threshold amount of memory allocation associated with a lowest level of performance of the application. If, for example, a signal strength value corresponding to the network connectivity parameter meets or falls below a threshold value associated with a lowest level of performance of the application but the expected memory to be allocated to the application is below a threshold amount of memory allocation associated with a lowest level of performance of the application, or vice versa, a graphical indicator indicative of an intermediate level of performance of the application may instead be displayed, for example.

In other example embodiments, the type of indication of performance status of an application that is output may depend on the number of application performance parameters associated with performance data indicative of a certain level of performance. For example, a graphical indicator indicative of a lowest level of performance of an application may only be displayed if at least a threshold number of application performance parameters (e.g., 3 application performance parameters) are associated with performance data indicative of the lowest level of performance. Similarly, a graphical indicator indicative of a highest level of performance of an application may only be displayed if at least a threshold number of application performance parameters are associated with performance data indicative of the highest level of performance. In certain example embodiments, even if a first threshold number of application performance parameters are associated with performance data indicative of the lowest level of performance, if a second threshold number (which may be the same as or different from the first threshold number) of application performance parameters are associated with performance data indicative of an intermediate and/or highest level of performance, a graphical indicator indicative of an intermediate level of performance of the application may be displayed. Similarly, in certain example embodiments, even if a first threshold number of application performance parameters are associated with performance data indicative of the highest level of performance, if a second threshold number (which may be the same as or different from the first threshold number) of application performance parameters are associated with performance data indicative of an intermediate and/or lowest level of performance, a graphical indicator indicative of an intermediate level of performance of the application may be displayed.

The level of performance of an application with respect to a particular application performance parameter (e.g., highest, lowest, or intermediate) may correspond to performance data that falls within a particular range of values. For example, the highest level of performance of an application with respect to a network connectivity parameter may correspond to any signal strength value that meets or exceeds a threshold value designated as being reflective of a desirable user experience. Further, the overall performance status of an application (e.g., highest, lowest, or intermediate) may be determined by the level of performance with respect to one or more critical application performance parameters or by the level of performance with respect to some set of application performance parameters (one or more of which may not be critical application performance parameters). For example, the overall performance status of an application may be at a lowest performance level if any particular critical application performance parameter is associated with performance data that falls within a range of values associated with lowest performance with respect to that parameter or some threshold number of application performance parameters are associated with performance data that falls within corresponding ranges of values associated with lowest or intermediate performance.

In certain example embodiments, more detailed performance information may be displayed upon selection of a graphical indicator indicative of a performance status of an application. The more detailed information may include, for example, an indication of the performance status of the application with respect to each of one or more application performance parameters. For example, the more detailed performance information may include a respective graphical indicator or respective text indicative of the expected performance with respect to each application performance parameter. Referring again to the color-coded scheme discussed earlier, if a "green" graphical indicator indicative of the highest level of performance of the application is displayed and selected, the more detailed information may include a "green" indicator or the text "good" in connection with text that references the network connectivity parameter, text that references the memory usage parameter, and so forth. As previously noted, even if the "green" indicator is displayed so as to indicate a highest level of overall performance of the application, the more detailed performance information may include a graphical indicator (e.g., a "yellow" indicator) or text indicative of a lower level of performance in connection with a specific application performance parameter.

In certain example embodiments, the more detailed information may include a performance score (also referred to herein as a user experience score) associated with an application. The performance score may be, for example, a numeric value that falls within a predetermined range of values indicative of a range of performance levels associated with an application. Each application performance parameter may be assigned a respective numeric value based on the respective performance data associated with the application performance parameter. For example, for a given application performance parameter, the corresponding performance data may be mapped to a particular numeric value in the predetermined range of values. More specifically, considering the network connectivity parameter as an example, a signal strength value (e.g., an RSSI value) determined with respect to this parameter may be mapped, in accordance with a predetermined mapping, to a particular numeric value in the range of values. In certain example embodiments, respective weights may be applied to the set of numeric values determined for a set of application performance parameters. For example, each numeric value may be multiplied by a respective weight. The weight applied to the numeric value associated with a particular application performance parameter may be determined based on an assessment of the impact of the application performance parameter on the overall performance of the application. For example, if the network connectivity parameter is determined to have a greater impact on the performance of an application than the memory usage parameter, a first weight applied to a first numeric value associated with the network connectivity parameter may be greater than a second weight applied to a second numeric value associated with the memory usage parameter. The weights may be modified over time based on application usage data and/or may be customizable by a user. For example, if usage data associated with an application indicates that a memory usage parameter has a greater impact on the performance of an application than an initial assessment indicated, the weight applied in connection with the memory usage data may be increased.

In other example embodiments of the disclosure, historical application usage data relating to a device location parameter, a time parameter, or the like may be collected and an application icon sorting order indicative of an order in which application icons are rendered on a display of a user device may be determined based on the historical application usage data and the occurrence of one or more conditions. The historical application usage data may indicate, for example, which application(s) are launched/executed at particular device locations and/or during particular times of day over a historical time period. More specifically, the historical application usage data may indicate a set of device locations, a set of time periods, and so forth in connection with which an application is launched, executed, or interacted with by a user. The historical application usage data may additionally, or alternatively, indicate a frequency of use of an application. For example, the historical application usage data may indicate a number of times an application is launched over a historical period of time, a duration that the application is in the foreground or otherwise running on a device during the historical period of time, etc. The historical application usage data may be specific to a particular user device and/or may be collected from an aggregate number of user devices.

A sorting order for application icons may then be determined based on the historical application usage data and the occurrence of one or more conditions. For example, if a current time falls within a time period in a set of time periods associated with a first application (as determined from the historical application usage data), the sorting order may prioritize an application icon corresponding to the first application over an application icon corresponding to a second application that is not historically launched, executed, or interacted with by a user during the current time. As another example, if a current device location corresponds to a device location in a set of device locations associated with a first application (as determined from the historical application usage data), the sorting order may prioritize an application icon corresponding to the first application over an application icon corresponding to a second application that is not historically launched, executed, or interacted with by a user in connection with the current device location. As another example, if a first application is more frequency launched/used than a second application over a given period of time, the sorting order may prioritize an application icon corresponding to the first application over an application icon corresponding to the second application. As yet another example, the sorting order of application icons may be based on the performance statuses associated with the corresponding applications. For example, an application icon corresponding to a first application associated with a current performance status indicative of a first performance level may be prioritized in the sorting order over an application icon corresponding to a second application associated with a current performance status indicative of a second performance level if the first performance level is higher than the second performance level. Prioritization of a first application icon over a second application icon in an application icon sorting order may result in the first application icon being rendered at a more prominent position or at a position at which the first application icon is otherwise more likely to be selected as compared to a position at which the second application icon is rendered. For example, if a first application icon is prioritized over a second application icon, the first application icon and the second application icon may be rendered on the same screen panel, but the first application icon may be rendered at a more prominent position (e.g., the top left of the display panel) than the second application icon. As another example, if a first application icon is prioritized over a second application icon, the first application icon may be rendered on a primary screen panel (e.g., the home screen) and the second application icon may be rendered on a secondary screen panel (e.g., a screen panel that is accessed by swiping to the left or right from the home screen).

Example embodiments of the disclosure provide a number of technical features, technical effects, and improvements to technology. For example, example embodiments of the disclosure provide technological improvements to existing device technologies by assessing the expected performance of an executable application with respect to one or more application performance parameters and outputting an indication of the expected performance prior to receiving a user command (or an automated command) to launch the application. This provides the technical effect of ensuring that an application is launched only when the expected performance of the application is acceptable to a user. As another example, example embodiments of the disclosure provide technological improvements to existing device technologies by collecting historical application usage data relating to a device location parameter, a time parameter, frequency of use parameter, or the like and determining an application icon sorting order indicative of an order in which application icons are rendered on a display of a user device based on the historical application usage data and the occurrence of one or more conditions. The application icon sorting order may additionally, or alternatively, be determined based at least in part on performance data relating to one or more application performance parameters. This provides the technical effect of ensuring that application icons corresponding to those application(s) most relevant to a current device location, a current time, or the like and/or to those application(s) expected to exhibit the highest performance are rendered in more prominent position(s) on the display. It should be appreciated that the above examples of technical features, technical effects, and improvements to technology of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Example Embodiments

FIG. 1 depicts different graphical indicators being displayed on a user device in association with an icon that is representative of an executable application based on changes in performance data relating to application performance parameters associated with the executable application in accordance with one or more example embodiments of the disclosure.

An example user device 102 is depicted in FIG. 1. The user device 102 may be a smartphone, a tablet, a personal digital assistant (PDA), a wearable computing device, a content streaming device, a gaming console, or the like. The user device 102 may include or may be operatively coupled to a display 104. For example, if the user device 102 is a smartphone, the display 104 may be integrally formed with the user device 102. Alternatively, if the user device 102 is a content streaming device or a gaming console, for example, the display 104 may be a television, a computer monitor, or the like that is peripherally connected to the user device 102. The display 104 may be reflective display (e.g., an electrophoretic display), an emissive display (e.g., an organic light-emitting diode (OLED) display), a transmissive display (e.g., a liquid-crystal display (LCD), or a display that utilizes any other display technology.

Various application icons representative of corresponding applications executable on the user device 102 are also depicted in FIG. 1 as being rendered on the display 104. For example, an application icon 106 representative of a content streaming application is shown as being rendered on the display 104. As previously described, various performance parameters may be associated with the content streaming application represented by the application icon 106. Certain performance parameters associated with the content streaming application may be default performance parameters that are also associated with one or more other applications. Such default performance parameters may include, for example, a network connectivity parameter, a CPU usage parameter, a memory usage parameter, a battery usage parameter, or the like. Other performance parameter(s) may have a specific association with one or more executable applications. For example, a GPS signal parameter may be associated with a navigation application (e.g., a maps application) but not with the content streaming application. Further, in certain example embodiments, an association between a performance parameter and an executable application may be customizable. For example, a user may be provided with the capability to specify one or more performance parameters to associate with the content streaming application.

Respective performance data may be determined for each performance parameter associated with the content streaming application. For example, respective performance data may be determined with respect to the content streaming application for each of a network connectivity parameter, a CPU usage parameter, a memory usage parameter, and a battery usage parameter. The type of performance data that is determined may depend on the particular type of parameter. For example, for the CPU usage parameter, an amount of CPU processing capacity expected to be utilized to launch and execute functionality of the application may be determined. More particularly, the performance data for the CPU usage parameter may be expressed as a percentage of the CPU processing capacity expected to be allocated to launch and execute functionality of the application. As another example, for the memory usage parameter, an amount of memory expected to be utilized by the application after the application is launched may be determined. The expected amount of memory to be allocated to the application may be expressed in any suitable units (e.g., MBs of available RAM). As yet another example, for the battery usage parameter, an expected amount of battery power that will be consumed by executing functionality associated with the application may be determined. The performance data determined for the battery usage parameter may be expressed, for example, as a percentage of total battery capacity expected to be consumed per unit of time.

As still another example, the performance data for the network connectivity parameter may include a signal strength of a network connection between the user device 102 and another device. For example, for a WiFi connection between the user device 102 and a wireless access point, for example, a signal strength of an RF signal received by the user device 102 from a transmitting antenna of the wireless access point may be determined. As another example, a signal strength of an RF signal transmitted across a Bluetooth connection between the user device 102 and another device may be determined. The signal strength may be expressed in any suitable units. For example, a received signal strength indicator (RSSI) value, an SNR value, or the like may be determined for a WiFi connection, a Bluetooth connection, or the like.

An application profile may be generated and stored in association with the content streaming application. The application profile may contain or otherwise reference performance data determined with respect to one or more application performance parameters associated with the content streaming application. As the performance data changes, the application profile stored in association with the content streaming application may be modified or a new application profile may be generated and a current application profile stored in association with the content streaming application may be overwritten with the new application profile.

For example, at time $t_0$, the application profile 112 may be associated with the content streaming application. The application profile 112 may include the example performance data depicted in FIG. 1, which as described earlier, may have been determined with respect to various application performance parameters associated with the content streaming application. In certain example embodiments, an application profile for an application may include a data field for an application performance parameter that is not associated with the application, in which case, the data field may not be populated with any data. For example, the application profile 112 may include a data field corresponding to the GPS signal parameter, but since this parameter may not be relevant to a content streaming application, the data field may not be populated with data.

The performance data contained in the application profile 112 may be compared to various threshold values to determine an expected performance level of the content streaming application. Any given application performance parameter may be associated with multiple threshold values, which together may define multiple tiers of performance of the content streaming application with respect to that application performance parameter. For example, the SNR value contained in the application profile 112 may be determined to meet or exceed a threshold value associated with a highest level of performance of the content streaming application with respect to the network connectivity parameter. Similarly, the amount of memory expected to be allocated to the content streaming application (as specified in the application profile 112) may be determined to meet or fall below a threshold value associated with a highest level of performance of the content streaming application with respect to the memory usage parameter. Similar types of comparisons of performance data corresponding to other application performance parameters to corresponding threshold values may also be made to determine an expected level of performance of the content streaming application with respect to other application performance parameters.

An overall performance status (e.g., the expected performance level) of the content streaming application may then be determined based on the expected performance level of the content streaming application with respect to one or more application performance parameters. The overall performance status of the content streaming application may be associated, for example, with a particular content streaming rate that is impacted by the performance data (e.g., the network signal strength, the expected memory allocation, etc.) associated with one or more application performance parameters. A graphical indicator 108 of the performance status of the content streaming application may then be rendered on the display 104 in association with (e.g., in proximity to) the application icon 106 representative of the content streaming application. While the graphical indicator 108 is depicted in FIG. 1 as an overlay over a portion of the application icon 106, it should be appreciated that the graphical indicator 108 (as well as any other graphical indicator described herein of the performance status of the content streaming application) may be displayed or the indication of the performance status of the content streaming application may be output in the form of text, audio data, haptic feedback, or in any other suitable manner that conveys to a user the expected performance status of the content streaming application.

In certain example embodiments, a color-coded scheme may be used to designate a performance status associated with a graphical indicator. For example, the graphical indicator 108 may be color-coded with a particular color (e.g., green) or otherwise rendered in a particular format, shape, or the like that indicates to a user that the content streaming application is associated with a performance status corresponding to an expected level of performance of the application that meets or exceeds a first threshold level of performance associated with a desirable user experience. As another example, text (e.g., a word or phrase) indicative of the performance status of the content streaming application may be displayed in addition to, or in lieu of, the graphical indicator 108. For example, the text "good" or the like may be rendered in an overlay on the display 104 of the user device 102 in proximity to the application icon 106 to indicate an expected level of performance of the content streaming application that meets or exceeds a first threshold level of performance associated with a desirable user experience.

In certain example embodiments, an application performance parameter may be designated as a critical application performance parameter for the content streaming application. For a critical application performance parameter, performance data relating thereto may be determinative of the performance status of the content streaming application, and thus, determinative of the indication of performance status that is output (e.g., the type of graphical indicator that is displayed). For example, if the network connectivity performance parameter is a critical application performance parameter for the content streaming application, and if the signal strength value corresponding to this parameter (as specified by the application profile 112) meets or exceeds a first threshold value associated with a highest level of performance, the graphical indicator 108 indicative of the highest level of performance of the application (e.g., the "green" indicator in the color-coded scheme noted above) may be displayed regardless of whether performance data associated with other application performance parameter(s) indicates lower levels of performance. In other example embodiments, a combination of application performance parameters may together be designated as critical. For example, the graphical indicator 108 indicative of the highest level of performance of the content streaming application may only be displayed if both the signal strength value corresponding to the network connectivity parameter meets or exceeds a threshold value associated with a highest level of performance of the application and expected memory to be allocated to the content streaming application meets or falls below a threshold amount of memory allocation associated with a highest level of performance of the content streaming application.

In other example embodiments, the type of indication of performance status of an application that is output may depend on the number of application performance parameters associated with performance data indicative of a certain level of performance. For example, the graphical indicator 108 indicative of a highest level of performance of the content streaming application may only be displayed if performance data relating to at least a threshold number of application performance parameters associated with the content streaming application are indicative of the highest level of performance. In certain example embodiments, even if a first threshold number of application performance parameters are associated with performance data indicative of the highest level of performance, if a second threshold number (which may be the same as or different from the first threshold number) of application performance parameters are associated with performance data indicative of an intermediate and/or lowest level of performance, a graphical indicator indicative of an intermediate level of performance of the content streaming application may be displayed.

In certain example embodiments, more detailed performance information may be displayed upon selection of the graphical indicator 108. The more detailed performance information may be displayed as part of an overlay 110 on a home screen rendered on the display 104, for example. The more detailed information may include, for example, an indication of the performance status of the content streaming application with respect to each of one or more application performance parameters. For example, the more detailed performance information may include a respective graphical indicator or respective text indicative of the expected performance with respect to each of one or more application performance parameters. Since the graphical indicator 108 is indicative of the highest level of performance of the content streaming application, the more detailed information may include the text "good" (or another comparable type of indication) in connection with text that references the network connectivity parameter (e.g., the text "network"), text that references the memory usage parameter (e.g., the text "memory"), and so forth. In certain example embodiments, the detailed performance information may only be displayed for those application performance parameters that are critical to the content streaming application. Although not depicted in FIG. 1, even if the indicator 108 indicative of the highest level of performance of the content streaming application is displayed, the more detailed performance information may include text or a graphical indicator (e.g., a "yellow" indicator) indicative of a lesser level of performance in connection with text that references an application performance parameter (e.g., the text "battery").

As depicted in FIG. 1, between time $t_0$ and time $t_1$, a change in performance data relating to one or more application performance parameters may occur. For example, a change in performance data relating to the network connectivity parameter may occur. More specifically, the strength of a received WiFi, Bluetooth, or other network signal may become diminished. As previously described, a signal strength value relating to the network connectivity parameter may be periodically determined. A signal strength value relating to the network connectivity parameter at time $t_1$ may be less than a first threshold signal strength value associated with a highest level of performance of the content streaming application with respect to the network connectivity parameter, but greater than a second threshold signal strength associated with a lowest level of performance, and thus, may correspond to an intermediate level of performance of the content streaming application with respect to the network connectivity parameter.

The application profile 112 may be modified to generate application profile 118 which may reflect the change in the performance data relating to the network connectivity parameter. Alternatively, a new application profile 118 may be generated and the previous application profile 112 may be overwritten with the new application profile 118. In certain example embodiments, the reduced signal strength value contained in the application profile 118 may result in a reduction of the overall performance status of the content streaming application from a highest level of performance to an intermediate level of performance. This reduction in the overall performance status of the content streaming application may occur despite performance data relating to other application performance parameters remaining substantially unchanged from the performance data contained in the application profile 112. The intermediate level of performance of the content streaming application at time $t_1$ may be associated with a content streaming rate that is less than a content streaming rate associated with the highest level of performance of the content streaming application at time $t_0$.

The change in the performance status of the content streaming application may be reflected by the rendering of the graphical indicator 114 in place of the graphical indicator 108. More specifically, rendering of the graphical indicator 108 may be ceased, and the graphical indicator 114 may instead be rendered in association with (e.g., in proximity to) the application icon 106. If the color-coded scheme described earlier is used, the graphical indicator 114 may be, for example, a "yellow" indicator that indicates an intermediate level of performance of the content streaming application. Further, more detailed performance information may be displayed upon selection of the graphical indicator 114. The more detailed performance information may be displayed as part of an overlay 116 on the home screen rendered on the display 104, for example. Similar to the detailed performance information displayed as part of the overlay 110, the detailed performance information displayed as part of the overlay 116 may include, for example, an indication of the performance status of the content streaming application with respect to each of one or more application performance parameters. As shown in FIG. 1, the detailed performance information may indicate a reduction in the performance characteristics of the network connectivity parameter from "good" to "fair."

As further depicted in FIG. 1, between time $t_1$ and time $t_2$, an additional change in performance data relating to one or more application performance parameters may occur. For example, a change in performance data relating to the memory usage parameter may occur. More specifically, the amount of memory (e.g., amount of RAM) allocated to the content streaming application or expected to be allocated to the content streaming application may increase. In particular, the amount of memory that is allocated or expected to be allocated to the content streaming application after it is launched and functionality relating thereto is executed may increase to an amount that meets or exceeds a threshold amount of memory allocation associated with a lowest level of performance of the content streaming application with respect to the memory usage parameter. Additionally, or alternatively, the amount of memory that is allocated or expected to be allocated to the content streaming application after it is launched and executed may increase to an amount that exceeds an available amount of memory on the user device 102.

The application profile 118 may be modified to generate application profile 124 which may reflect the change in the performance data relating to the memory usage parameter. Alternatively, a new application profile 124 may be generated and the previous application profile 118 may be overwritten with the new application profile 124. In certain example embodiments, the increased memory allocation specified in the application profile 124 may result in a further reduction of the overall performance status of the content streaming application from the intermediate level of performance at time $t_1$ to the lowest level of performance at time $t_2$. This reduction in the overall performance status of the content streaming application may occur despite performance data relating to other application performance parameters remaining substantially unchanged from the performance data contained in the application profile 118. The lowest level of performance of the content streaming application at time $t_2$ may be associated with an even lower content streaming rate than the intermediate level of performance of the content streaming application at time $t_1$. In certain example embodiments, the content streaming rate associated with the lowest level of performance of the content streaming application may be so low so as to cause the content streaming application to become unusable for streaming content. For example, the content streaming rate associated with the lowest level of performance of the content streaming application may correspond to a content buffering time that meets or exceeds a threshold value that delineates an acceptable user experience from an undesirable user experience.

The change in the performance status of the content streaming application from time $t_1$ to time $t_2$ may be reflected by the rendering of the graphical indicator 120 in place of the graphical indicator 114. More specifically, rendering of the graphical indicator 114 may be ceased, and the graphical indicator 120 may instead be rendered in association with (e.g., in proximity to) the application icon 106. If the color-coded scheme described earlier is used, the graphical indicator 120 may be, for example, a "red" indicator that indicates a lowest level of performance of the content streaming application. Further, more detailed performance information may be displayed upon selection of the graphical indicator 120. The more detailed performance information may be displayed as part of an overlay 122 on the home screen rendered on the display 104, for example. Similar to the detailed performance information displayed as part of the overlay 110 or the overlay 116, the detailed performance information displayed as part of the overlay 122 may include, for example, an indication of the performance status of the content streaming application with respect to each of one or more application performance parameters. As shown in FIG. 1, the detailed performance information may indicate a reduction in the performance characteristics of the memory usage parameter from "good" to "poor."

In certain example embodiments, in addition to, or in lieu of, rendering the graphical indicator 120, the application icon 106 may become unselectable when the performance level of the content streaming application is at the lowest level of performance (or at or below some intermediate level of performance). For example, the application icon 106 may be rendered in a different format, shape, style, or the like that indicates to a user that the application icon 106 is not selectable, and thus, that the current performance status of the content streaming application corresponds to a performance level at which the content streaming rate is too low to provide an acceptable user experience.

Although FIG. 1 depicts a change in performance data with respect to a different application performance parameter from time $t_0$ to time $t_1$ than from time $t_1$ to time $t_2$, it should be appreciated that the performance data relating to the same application performance parameter may have changed instead. For example, from time $t_1$ to time $t_2$, the network signal strength may have further diminished, potentially resulting in a reduction from the intermediate level of performance of the content streaming application with respect to the network connectivity parameter at time $t_1$ to a lowest level of performance of the content streaming application with respect to the network connectivity parameter at time $t_2$. Such a further reduction in the network signal strength may result in a reduction in the overall performance status of the content streaming application to a lowest level of performance. In other example embodiments, even if the performance data relating to an application performance parameter indicates a lowest level of performance of the content streaming application with respect to that parameter, the overall performance status of the content streaming application may nonetheless be at an intermediate level of performance. For example, if the memory usage parameter is not a critical application performance parameter or a threshold number of other application performance parameters are associated with performance data at time $t_2$ that indicates an intermediate and/or high level of performance of the content streaming application with respect to those application performance parameters, the overall performance status of the content streaming application may remain at an intermediate level of performance at time $t_2$ rather than the lowest level of performance indicated by the graphical indicator 120.

Figure 2:
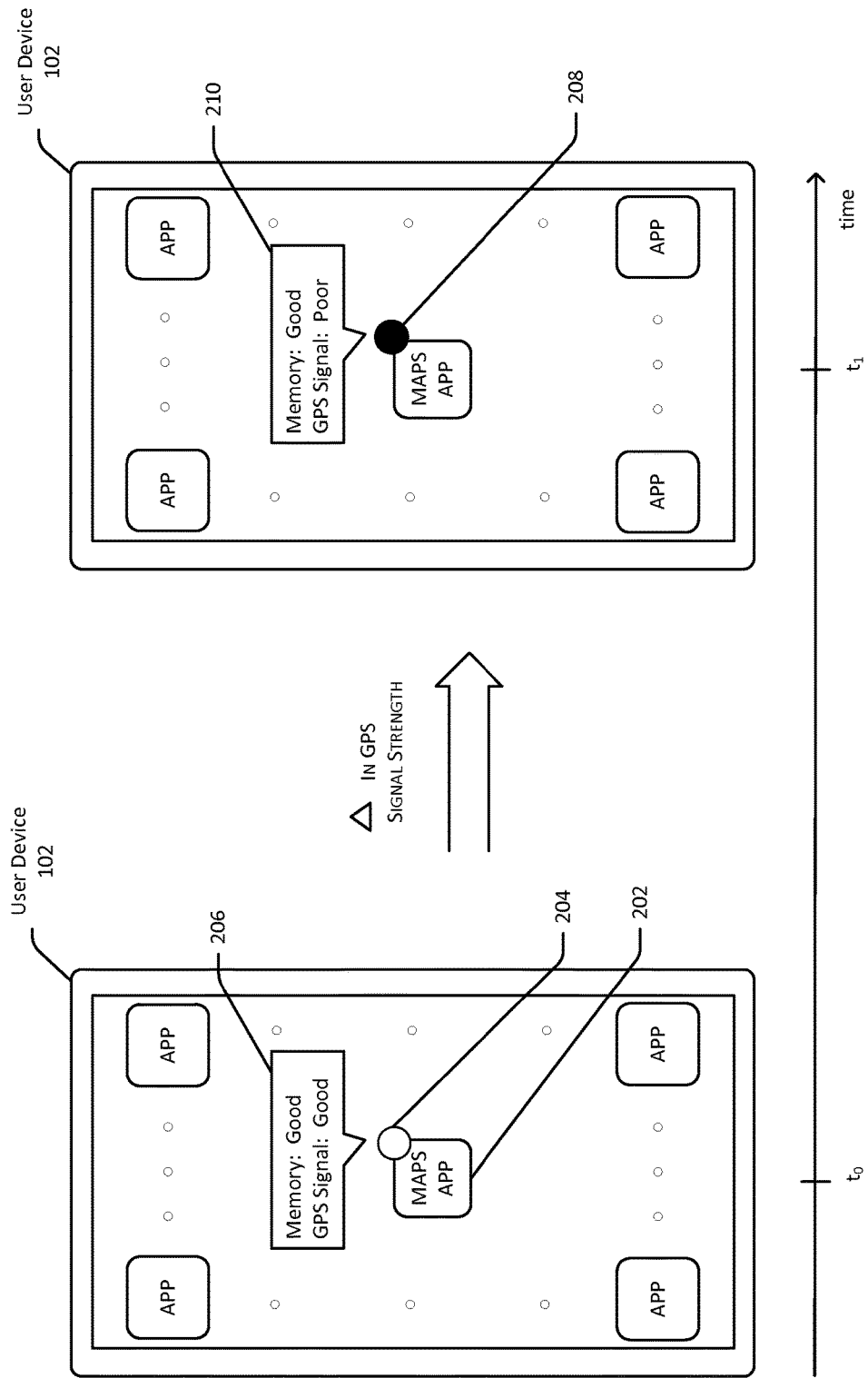
FIG. 2 depicts different graphical indicators being displayed on a user device in association with an icon that is representative of an executable navigation application based on a change in signal strength of a Global Positioning System (GPS) signal received by the user device in accordance with one or more example embodiments of the disclosure.

FIG. 2 depicts different graphical indicators being displayed on a user device in association with an icon that is representative of an executable navigation application based on a change in signal strength of a GPS signal received by the user device in accordance with one or more example embodiments of the disclosure.

The user device 102 depicted in FIG. 1 is once again shown in FIG. 2. An example navigation application (or other application that uses location-based services) may be represented by an application icon 202 rendered on the display 104 of the user device 102. A graphical indicator 204 indicative of a current performance status of the navigation application may be rendered on the display 104 in association with the application icon 202. In certain example embodiments, the graphical indicator 204 may indicate a performance status of the navigation application at time $t_0$ that corresponds to a highest level of performance. As previously described, that performance status may be determined based on performance data associated with one or more application performance parameters associated with the navigation application. Further, selection of the graphical indicator 204 may result in more detailed performance information being displayed as part of an overlay 206. As shown in FIG. 2, the detailed performance information may indicate a high or highest level of performance of the navigation application with respect to all or some subset of the application performance parameters (e.g., those application performance parameters that are critical to performance of the navigation application).

From time $t_0$ to time $t_1$, a change in performance data relating to an application performance parameter may occur. For example, the strength of a GPS signal received by a GPS receiver of the user device 102 may become diminished. The GPS signal strength value associated with the GPS signal parameter at time $t_1$ may meet or fall below a threshold GPS signal strength value associated with a lowest level of performance of the navigation application with respect to the GPS signal parameter. If, for example, the GPS signal parameter is a critical application performance parameter for the navigation application, this reduction in the GPS signal strength value may result in the overall performance status of the navigation application dropping to a lowest level of performance. The lowest level of performance of the navigation application may be indicated by the graphical indicator 208 (e.g., a "red" indicator in the color-coded scheme described earlier). More specifically, based on the change in the GPS signal strength from time $t_0$ to time $t_1$, the graphical indicator of the performance status of the navigation application may transition from the graphical indicator 204 to the graphical indicator 208. Further, selection of the graphical indicator 208 may result in more detailed performance information being displayed as part of the overlay 210. The detailed performance information may include an indication (e.g., the text "poor") of the performance level of the navigation application with respect to the GPS signal parameter as well as an indication of the performance level of the navigation application with respect to one or more additional application performance parameters.

Figure 3:
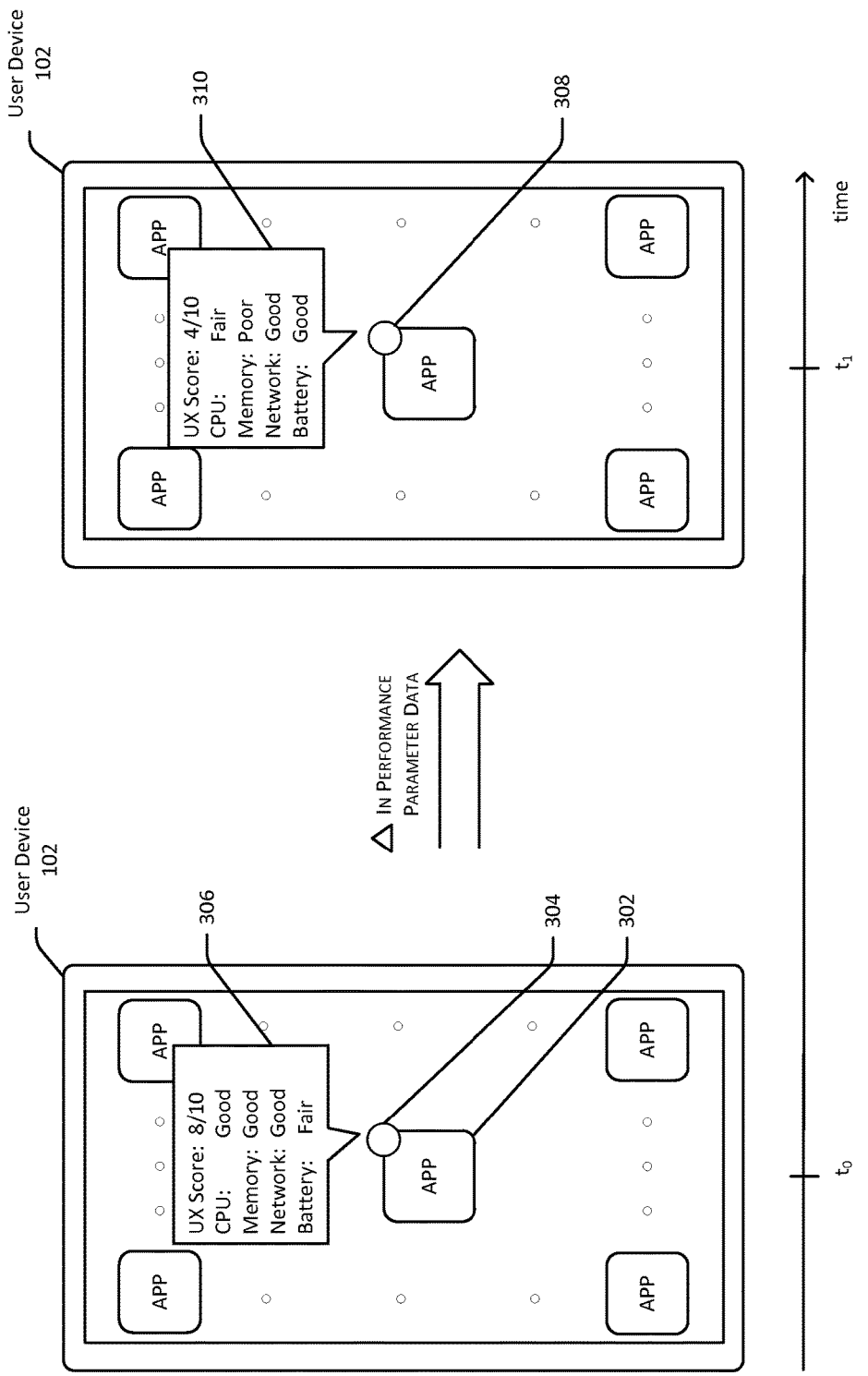
FIG. 3 depicts different application performance scores being displayed in association with an icon that is representative of an executable application based on changes in performance data relating to application performance parameters associated with the executable application in accordance with one or more example embodiments of the disclosure.

FIG. 3 depicts different application performance scores being displayed in association with an icon that is representative of an executable application based on changes in performance data relating to application performance parameters associated with the executable application in accordance with one or more example embodiments of the disclosure.

The user device 102 depicted in FIGS. 1 and 2 is once again shown in FIG. 3. An example application may be represented by an application icon 302 rendered on the display 104 of the user device 102. A graphical indicator 304 indicative of a current performance status of the application may be rendered on the display 104 in association with the application icon 302. In certain example embodiments, the graphical indicator 304 may indicate a performance status of the application at time $t_0$ that corresponds to a relatively high level of performance.

As previously described, the performance status of the application may be determined based on performance data associated with one or more application performance parameters associated with the application. In particular, a performance score (also referred to herein as a user experience score) may be determined for the application based on the performance data available at time $t_0$. The performance score may be, for example, a numeric value that falls within a predetermined range of values indicative of a range of performance levels associated with the application. In certain example embodiments, the performance score associated with the application at time $t_0$ may be displayed as part of an overlay 306 that also includes detailed performance information associated with each of one or more application performance parameters. The overlay 306 may be displayed upon user selection of the graphical indicator 304.

As part of determining the performance score, each application performance parameter may be assigned a respective numeric value based on the respective performance data associated with the application performance parameter. For example, for a given application performance parameter, the corresponding performance data may be mapped to a particular numeric value in the predetermined range of values. More specifically, a signal strength value (e.g., an RSSI value) determined with respect to the network connectivity parameter may be mapped, in accordance with a predetermined mapping, to a particular numeric value in the range of values. Similarly, performance data associated with the memory usage parameter, performance data associated with the CPU usage parameter, and performance data associated with the battery usage parameter may each be mapped to corresponding numeric values. Performance data indicative of higher levels of performance with respect to a given application performance parameter may be mapped to higher numeric values in the range of values, and similarly, performance data indicative of lower levels of performance with respect to a given application performance parameter may be mapped to lower numeric values in the range of values. The mapping may be a linear or non-linear mapping. The numeric values determined for a set of application performance parameters associated with an application may be aggregated (e.g., averaged) to determine the performance score.

In certain example embodiments, respective weights may be applied to the set of numeric values determined for a set of application performance parameters prior to aggregating the numeric values. For example, each numeric value may be multiplied by a respective weight. The weight applied to the numeric value associated with a particular application performance parameter may be determined based on an assessment of the impact of the application performance parameter on the overall performance of the application. For example, if the network connectivity parameter is determined to have a greater impact on the performance of an application than the memory usage parameter, a first weight applied to a first numeric value associated with the network connectivity parameter may be greater than a second weight applied to a second numeric value associated with the memory usage parameter. The weights may be modified over time based on application usage data and/or may be customizable by a user. For example, if usage data associated with an application indicates that a memory usage parameter has a greater impact on the performance of an application than an initial assessment indicated, the weight applied in connection with the memory usage data may be increased.

In certain example embodiments, a change in performance data may occur from time $t_0$ to time $t_1$. For example, an amount of CPU processing capacity allocated or expected to be allocated to the application at next launch of the application may increase, thereby resulting in a reduction in performance of the application with respect to that parameter. As another example, an amount of memory allocated or expected to be allocated to the application at next launch of the application may increase, thereby resulting in a reduction in performance of the application with respect to that parameter. As a result of the reduced performance of the application from time $t_0$ to time $t_1$ with respect to one or more application performance parameters, the performance score of the application at time $t_1$ may be lower than the performance of the application at time $t_0$.

More specifically, the increased CPU processing capacity allocated to the application at time $t_1$ (as compared to time $t_0$) may be mapped to a lower numeric value. Similarly, the increased memory allocation associated with the application at time $t_1$ (as compared to time $t_0$) may also be mapped to a lower numeric value. These lower numeric values may contribute to an overall lower performance score at time $t_1$ (as compared to time $t_0$). In certain example embodiments, the performance data associated with a particular application performance parameter (e.g., the battery usage parameter) may actually reflect an increased performance level of the application with respect to that parameter from time $t_0$ to time $t_1$, thereby resulting in an increase in the numeric value associated with that parameter. However, that increase may be outweighed by the decrease in the numeric values associated with other application performance parameters (e.g., the CPU usage parameter and the memory usage parameter), thereby resulting in an overall decrease in the performance score associated with the application.

In certain example embodiments, the performance score associated with the application at time $t_1$ may be displayed as part of an overlay 310 that also includes detailed performance information associated with each of one or more application performance parameters. The detailed performance information may indicate performance characteristics with respect to each of the application performance parameters, thereby providing a more granular indication of the performance of the application than the performance score alone. The overlay 310 may be displayed upon user selection of a graphical indicator 308. Although not depicted in FIG. 3, the graphical indicator 308 may take on a different color, shape, form, or the like than the graphical indicator 304 to indicate the change in performance status of the application reflected by the changed performance score.

Figure 4:
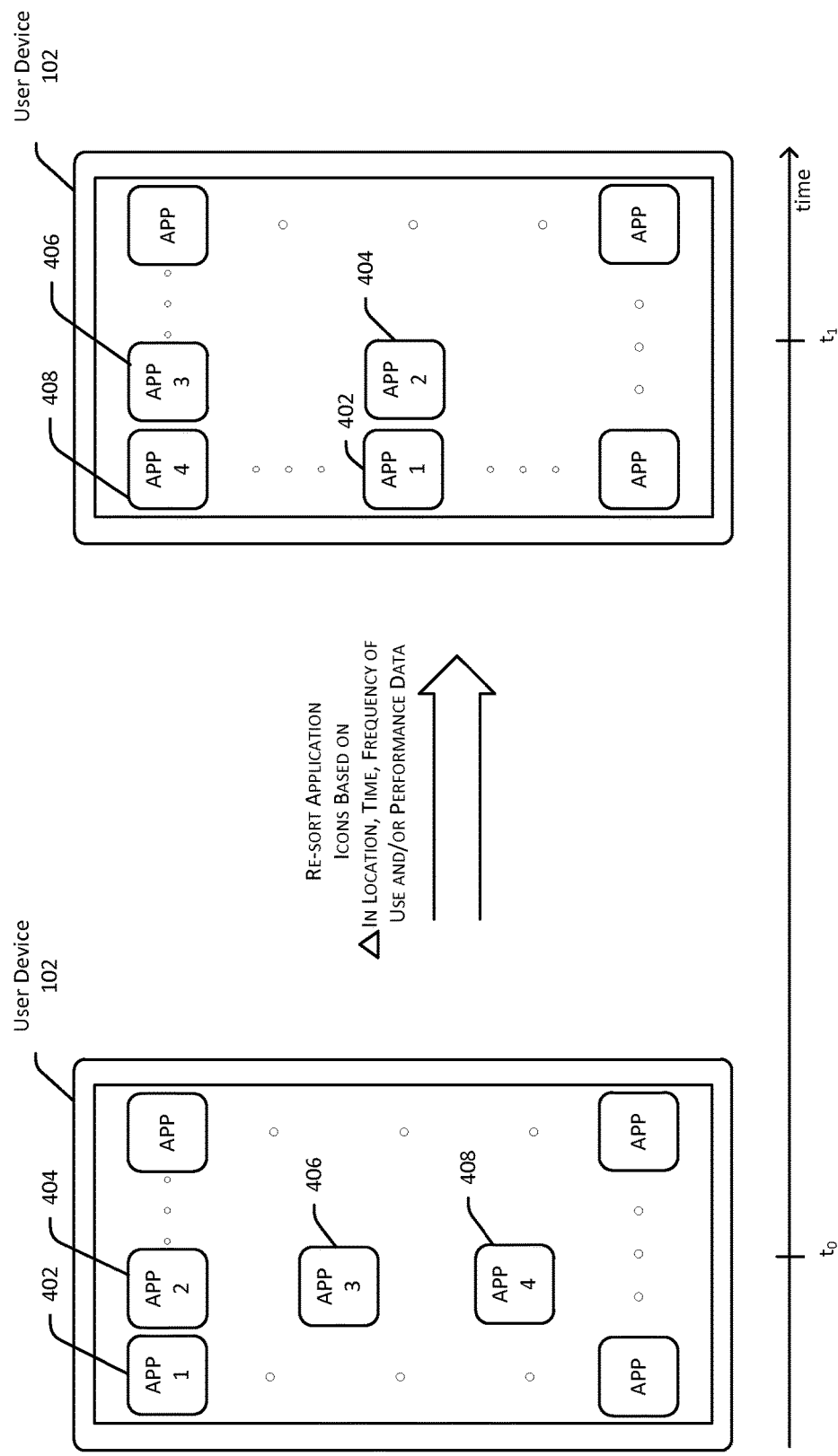
FIG. 4 depicts a change in the sorting order of application icons based on device location, time, historical application usage data, and/or performance data relating to application performance parameters in accordance with one or more example embodiments of the disclosure.

FIG. 4 depicts a change in the sorting order of application icons based on device location, time, historical device usage data, and/or performance data relating to application performance parameters in accordance with one or more example embodiments of the disclosure.

The user device 102 depicted in FIGS. 1-3 is once again shown in FIG. 4. At time $t_0$, a collection of application icons may be rendered on the display 104 of the user device 102 as part of a home screen user interface. The collection of application icons rendered at time $t_0$ may include, for example, a first application icon 402, a second application icon 404, a third application icon 406, and a fourth application icon 408. The application icons 402-408 may be rendered in accordance with a first application icon sorting order. More specifically, in certain embodiments of the disclosure, historical application usage data relating to a device location parameter, a time parameter, or the like may be collected and a first application icon sorting order indicative of an order in which the collection of application icons are to be rendered on the display 104 of the user device 102 may be determined based on the historical application usage data and the occurrence of one or more conditions. The historical application usage data may indicate, for example, which application(s) are launched/executed at particular device locations and/or during particular times of day over a historical time period. More specifically, the historical application usage data may indicate a set of device locations, a set of time periods, and so forth in connection with which an application is launched, executed, or interacted with by a user. The historical application usage data may be specific to the user device 102 and/or may be collected from an aggregate number of user devices.

The first application icon sorting order for the collection of application icons may then be determined based on the historical application usage data and the occurrence of one or more conditions. For example, if a current time falls within a time period in a set of time periods associated with a first application (as determined from the historical application usage data), the first application icon sorting order may prioritize the first application icon 402 corresponding to the first application over the application icons 404-408 corresponding to applications that are not historically launched, executed, or interacted with by a user during the current time. As another example, if a current device location corresponds to a device location in a set of device locations associated with a second application (as determined from the historical application usage data), the first application icon sorting order may prioritize the second application icon 404 corresponding to the second application over the application icons 406-408 corresponding to applications that are not historically launched, executed, or interacted with by a user in connection with the current device location. As yet another example, the first application icon sorting order may be based on the performance statuses associated with the corresponding applications. For example, the application icon 402 may correspond to a first application associated with a current performance status indicative of a higher performance level than the current performance statuses associated with applications to which the application icons 404-408 correspond, and thus, the application icon 402 may be prioritized in the first application sorting order over the application icons 404-408. As depicted in FIG. 4, prioritization of the first application icon 402 over the second application icon 404, for example, in the first application icon sorting order may result in the first application icon 402 being rendered at a more prominent position or at a position at which the first application icon 402 is otherwise more likely to be selected by a user as compared to a position at which the second application icon 404 is rendered.

Between time $t_0$ and $t_1$, a change in one or more conditions may occur. For example, a change in a location of the user device 102, a change in time, and/or a change in performance data relating to one or more application performance parameters associated with one or more applications may occur. Additionally, or alternatively, additional application usage data that is specific to the user device 102 or that is collected from multiple user devices may be generated. The additional application usage data may indicate additional/different device locations, additional/different time periods, etc. in connection with which one or more applications are launched, executed, or interacted with by a user.

Based on the changed set of conditions between time $t_0$ and time $t_1$ and/or additional application usage data that is generated, a second application icon sorting order for the collection of application icons may be determined. The second application icon sorting order may result in a different prioritization of the application icons 402-408. For example, a new current location of the user device 102 may correspond to a device location in a set of device locations associated with a fourth application (as determined from the historical application usage data), and thus, the second application icon sorting order may prioritize the fourth application icon 408 corresponding to the fourth application over the application icons 402-406 corresponding to applications that are not historically launched, executed, or interacted with by a user in connection with the current device location. As another example, performance data relating to application performance parameters associated with a third application represented by the third application icon 406 may indicate a higher level of performance of the third application as compared to applications represented by the application icons 402, 404, 408, and thus, the third application icon 406 may be prioritized in the second application icon sorting order ahead of the application icons 402, 404, 408.

In certain example embodiments, the application usage data may indicate a respective frequency of use associated with each of one or more applications over a historical time period. A sorting order of corresponding application icons may then be determined based the usage frequency of the applications. For example, application usage data available at time $t_0$ may indicate that an application to which the application icon 402 corresponds has been launched, executed, or the like a greater number of times or for a greater duration of time over a historical time period (e.g., the past month) than applications to which the application icons 404-408 correspond. Based on this greater frequency of use, the first application icon sorting order may prioritize application icon 402 over application icons 404-408. Subsequently, application usage data available at time $t_1$ may indicate that the application to which application icon 408 corresponds now has a greater frequency of use (e.g., a greater number of launches, a longer duration of execution, etc.) over a historical time period that includes the time period between time $t_0$ and time $t_1$ than applications to which application icons 402-406 correspond. As such, at time $t_1$, the second application icon sorting order may prioritize application icon 408 over application icons 402-406.

Further, in certain example embodiments, the prioritization of an application icon in an application icon sorting order may be determined based at least in part on the relationship between an application's functionality and a device location, a time, another application's functionality, or the like. For example, if the current location of the user device 102 corresponds to a movie theater address, an application icon corresponding to a dinner reservation application, an application icon corresponding to a restaurant review application, or the like may be prioritized ahead of other application icons. As another example, if a calendar application indicates a scheduled flight within a predetermined period of time from the current time, an application icon corresponding to a car service application, an application icon corresponding to an airline application, or the like may be prioritized in an application icon sorting order ahead of other application icons.

While prioritization of application icons has been discussed above in the context of a single user interface (e.g., the home screen panel), it should be appreciated that an application icon sorting order may indicate which screen panel an application icon is to be rendered on among multiple screen panels. For example, an application icon sorting order determined based at least in part application usage data and/or the occurrence of one or more conditions may indicate that the first application icon 402 is to be rendered on the home screen panel and one or more of the application icons 404-408 are to be rendered on one or more secondary screen panels. For example, in certain example embodiments, application icons corresponding to those applications that are most frequently used (as determined from number of application launches, duration of execution, etc.) may be rendered on the home screen panel while application icons corresponding to less frequently used applications may be rendered on one or more secondary screen panels. As another example, applications icons corresponding to applications exhibiting the highest performance levels may be rendered on the home screen panel.

FIG. 5 depicts the generation of an application profile in accordance with one or more example embodiments of the disclosure. FIG. 6 depicts the generation of application icon sorting data in accordance with one or more example embodiments of the disclosure.

Referring first to FIG. 5, the user device 102 depicted in FIGS. 1-4 is once again shown. The user device 102 may be communicatively coupled to one or more networks 504. In addition, one or more additional user devices 502(1)-502(N) may also be communicatively coupled to the network(s) 504. The network(s) 504 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 504 may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The user device 102 may include one or more storage media storing one or more application profile generation module(s) 510. The application profile generation module(s) 510 may include computer-executable instructions, code, or the like that is executable by one or more processors of the user device 102 to cause operations to be performed for generating an application profile 512. The application profile 512 may correspond to any of the application profiles depicted in FIG. 1. The application profile 512 may include performance data relating to application performance parameter(s) associated with one or more applications executable on the user device 102. The performance data determined for one or more application performance parameters may include data 506 that is dynamically determined with respect to user device 102 and/or historical performance data 508 collected across an aggregate number of devices. For example, for the network connectivity parameter, the application profile generation module(s) 510 may periodically determine a signal strength (e.g., an RSSI value) of a signal received over a network connection between the user device 102 and another device. Similarly, for the GPS signal parameter, the application profile generation module(s) 510 may periodically determine the strength of a GPS signal received by a GPS receiver of the user device 102.

Further, for any given application performance parameter, the performance data may include data 508 collected from an aggregate number of devices. For example, for the CPU usage parameter, the memory usage parameter, and/or the battery usage parameter, historical usage data 508 relating to these parameters and associated with execution of a respective instance of an application on each of any number of user devices (e.g., the user devices 502(1)-502(N)) may be collected over a period of time. This historical usage data 508 may then be used as benchmark performance data for the application on the user device 102. This benchmark performance data may then be modified, supplemented, etc. using performance data 506 dynamically determined on the user device 102.

Referring now to FIG. 6, the user device 102 depicted in FIGS. 1-5 is once again shown. The user device 102 may be communicatively coupled to one or more networks 604. In addition, one or more additional user devices 602(1)-602(X) may also be communicatively coupled to the network(s) 604. The network(s) 604 may include any of the example types of networks and communication media described in reference to the network(s) 504.

The user device 102 may include one or more storage media storing one or more application icon sorting module(s) 612. The application icon sorting module(s) 612 may include computer-executable instructions, code, or the like that is executable by one or more processors of the user device 102 to cause operations to be performed for generating sorting data 614 indicative of an application icon sorting order. More specifically, the application icon sorting module(s) 612 may receive various types of input data to generate the sorting data 614. The input data may include, for example, dynamically determined data 606 that may include data indicative of a current location of the user device 102, a current time, or the like. The input data may further include historical application usage data 608 that is specific to the user device 102 as well as aggregate historical application usage data 610 that is collected from one or more of the user device(s) 602(1)-602(X). The application usage data 608 may indicate device locations, times, frequency or use, or the like in connection with which one or more applications are launched, executed, or interacted with by a user on the user device 102 over some historical time period. Similarly, the application usage data 610 may indicate device locations, times, frequency of use, or the like in connection with which one or more applications are launched, executed, or interacted with by a user on one or more of the user device(s) 602(1)-602(X) over one or more historical time periods.

Illustrative Processes

Figure 7:
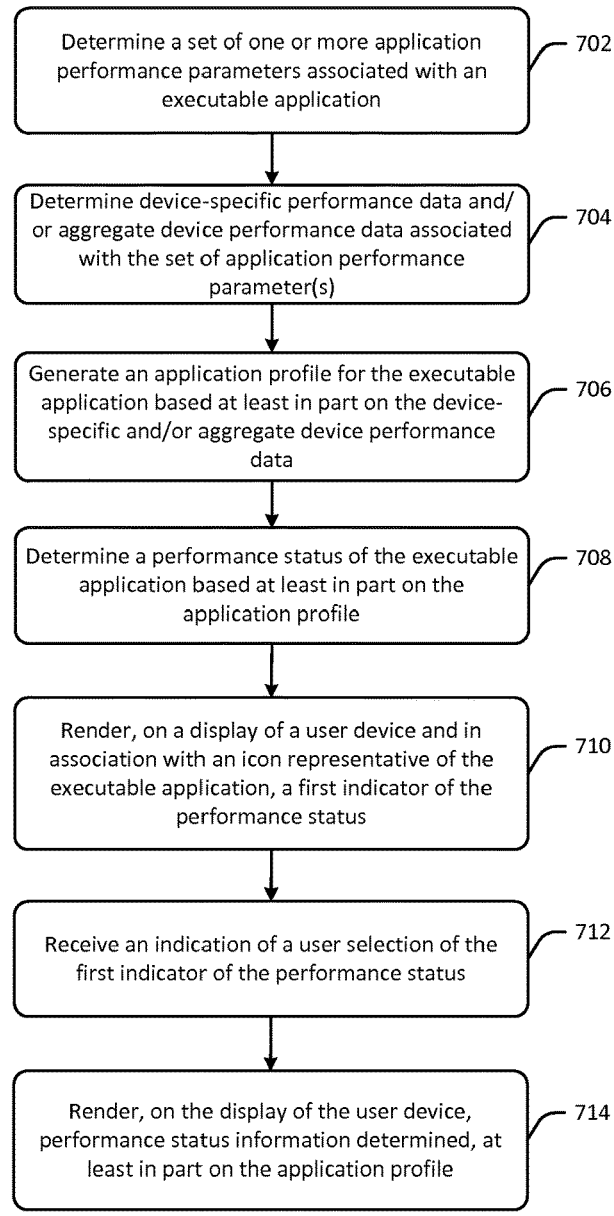
FIG. 7 is a process flow diagram of an illustrative method for determining the performance status of an executable application based at least in part on performance data relating to one or more application performance parameters and displaying an indicator of the performance status on a display of a user device in association with an application icon representative of the executable application in accordance with one or more example embodiments of the disclosure.

FIG. 7 is a process flow diagram of an illustrative method 700 for determining the performance status of an executable application based at least in part on performance data relating to one or more application performance parameters and displaying an indicator of the performance status on a display of a user device in association with an application icon representative of the executable application in accordance with one or more example embodiments of the disclosure.

At block 702, the application profile generation module(s) 510 may be executed to determine a set of one or more application performance parameters associated with an executable application. The set of application performance parameters associated with the executable application may include one or more default performance parameters associated with each of multiple executable applications. Further, one or more of the application performance parameters may be user-specified. The set of application performance parameters may include, for example, a CPU usage parameter, a memory usage parameter, a network connectivity parameter, a location-based services performance parameter (e.g., a GPS signal parameter), a battery usage parameter, and so forth.

At block 704, the application profile generation module(s) 510 may determine performance data associated with the set of application performance parameters. The performance data may include device-specific performance data and/or aggregate device performance data. More specifically, the performance data determined for the set of application performance parameter(s) may include data that is dynamically determined with respect to a particular user device on which the executable application can be launched and/or historical performance data collected across an aggregate number of devices. For example, for the network connectivity parameter, a signal strength (e.g., an RSSI value) of a signal received over a network connection between the particular user device and another device may be determined. For the CPU usage parameter, on the other hand, the performance data may include CPU usage data associated with launching and execution of the application on multiple user devices. Such aggregate device performance data may serve as benchmark data for the particular user device.

At block 706, the application profile generation module(s) 510 may be executed to generate an application profile for the executable application. The application profile may include the device-specific performance data and/or the aggregate device performance data. At block 708, one or more application performance status determination modules may be executed to determine a performance status of the executable application based at least in part on the application profile. In particular, at block 708, an overall performance status of the executable application may be determined based on the performance data contained in the application profile. A type of indication to output that is indicative of the overall performance status of the executable application may also be determined.

At block 710, one or more rendering modules may be executed to output the indication of the performance status of the executable application. For example, a graphical indicator of the performance status may be rendered on a display of a user device in association with an icon representative of the executable application. At block 712, an indication of a user selection of the indicator of the performance status may be received. Based on receipt of the user selection of the performance status indicator, at block 714, detailed performance status information determined, at least in part, from the device-specific performance data and/or the aggregate device performance data may be rendered on the display of the user device.

Figure 8:
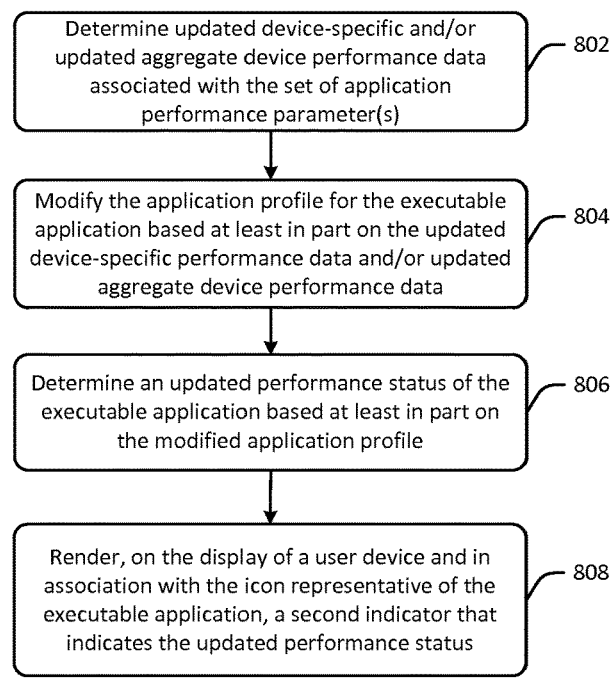
FIG. 8 is a process flow diagram of an illustrative method for determining that a change in performance data relating to one or more application performance parameters has occurred that alters the performance status of an executable application and modifying an indicator displayed on a user device in association with an application icon representative of the executable application to indicate the altered performance status in accordance with one or more example embodiments of the disclosure.

FIG. 8 is a process flow diagram of an illustrative method 800 for determining that a change in performance data relating to one or more application performance parameters has occurred that alters the performance status of an executable application and modifying an indicator displayed on a user device in association with an application icon representative of the executable application to indicate the altered performance status in accordance with one or more example embodiments of the disclosure.

At block 802, the application profile generation module(s) 510 may be executed to determine updated device-specific and/or updated aggregate performance device data associated with the set of application parameter(s) determined at block 702 of method 700. For example, an updated network signal strength may be determined that is indicative of an increase or decrease in signal strength from a previously determined value. As another example, additional CPU usage performance data may be collected from additional user device(s), thereby resulting in updated aggregate CPU usage performance data.

At block 804, the application profile generation module(s) 510 may be executed to modify the application profile for the executable application to include the updated device-specific data and/or updated aggregate device data. Alternatively, a new application profile that includes the updated device-specific data and/or updated aggregate device data may be generated.

At block 806, the application performance status determination module(s) may be executed to determine an updated performance status of the executable application based at least in part on the modified application profile. The updated performance status may be indicative of a higher or lower level of performance than the performance status determined at block 708 of method 700.

At block 808, an indication of the updated performance status may be output from a user device. More specifically, one or more rendering modules may be executed to render, on a display of the user device and in association with the icon representative of the executable application, a different indicator that indicates the updated performance status. For example, if the original performance status is indicative of a highest level of performance and the updated performance status is indicative of an intermediate level of performance, the rendering module(s) may render a "yellow" graphical indicator to indicate the intermediate level of performance rather than a "green" graphical indicator that indicates the highest level of performance associated with the original performance status.

Figure 9:
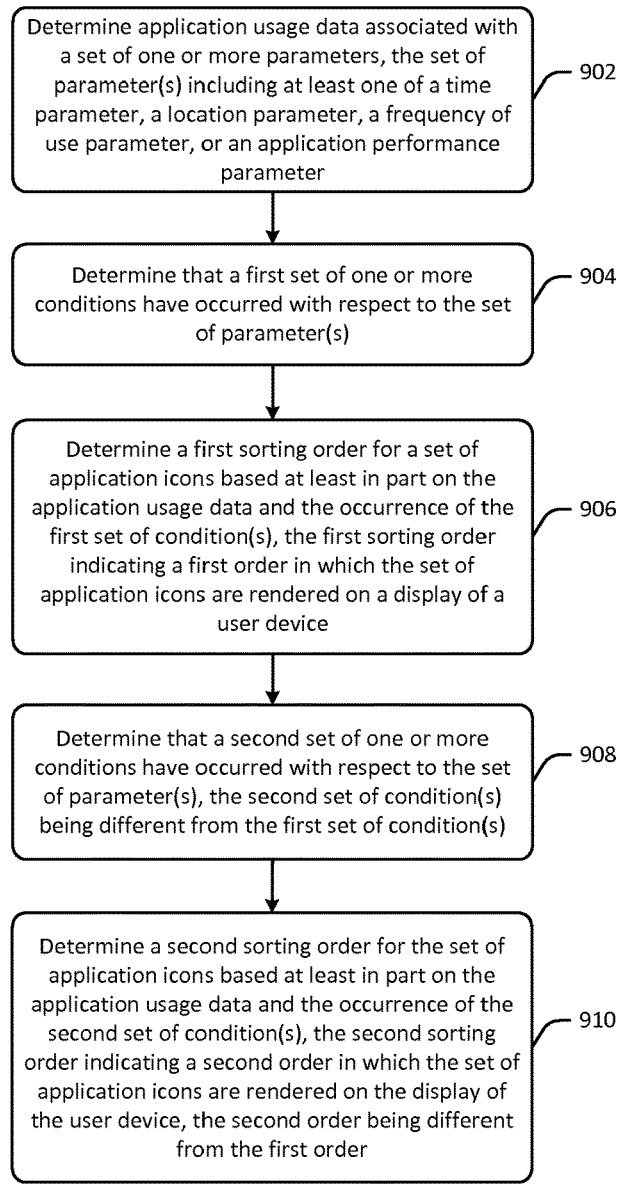
FIG. 9 is a process flow diagram of an illustrative method for determining a sorting order of application icons in accordance with one or more example embodiments of the disclosure.

FIG. 9 is a process flow diagram of an illustrative method 900 for determining a sorting order of application icons in accordance with one or more example embodiments of the disclosure.

At block 902, one or more application icon sorting modules may be executed to determine application usage data associated with a set of one or more parameters. The set of parameter(s) may include at least one of a time parameter, a location parameter, a frequency of use parameter, or an application performance parameter. At block 904, the application icon sorting module(s) 614 may be executed to determine that a first set of one or more conditions have occurred with respect to the set of parameter(s). The first set of condition(s) may include a user device being in a particular location, a particular time of day occurring, or the like.

At block 906, the application icon sorting module(s) may be executed to determine a first sorting order for a set of application icons based at least in part on the application usage data and the occurrence of the first set of condition(s). The first sorting order may indicate a first order in which the set of application icons are to be rendered on a display of a user device. The first sorting order may prioritize certain application icons over others based on the application usage data and the occurrence of the first set of condition(s).

At block 908, the application icon sorting module(s) 614 may be executed to determine that a second set of one or more conditions have occurred with respect to the set of parameter(s). The second set of condition(s) may be different from the first set of condition(s). For example, the second set of condition(s) may include a change in a location of the user device, a change in the time of day, or the like.

At block 910, the application icon sorting module(s) 614 may be executed to determine a second sorting order for the set of application icons based at least in part on the application usage data and the occurrence of the second set of condition(s). The second sorting order may indicate a second order in which the set of application icons are to be rendered on the display of the user device. The second order may be different from the first order based at least in part on the second set of condition(s) being different from the first set of condition(s).

Illustrative Device Architecture

Figure 10:
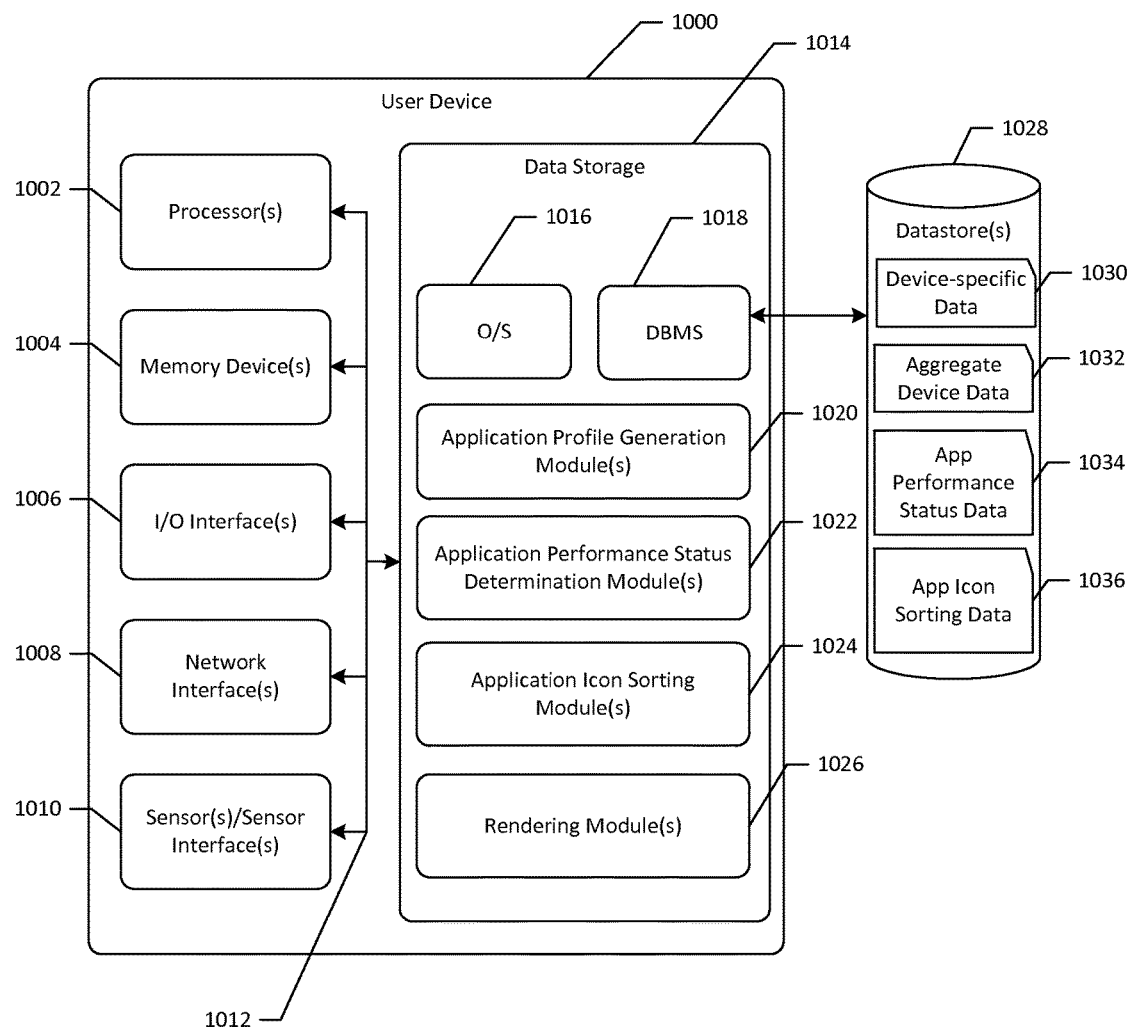
FIG. 10 is a schematic block diagram of an illustrative configuration of a user device in accordance with one or more example embodiments of the disclosure.

FIG. 10 is a schematic block diagram of an illustrative configuration of a user device 1000 in accordance with one or more example embodiments of the disclosure. In an illustrative configuration, the device 1000 may include one or more processors (processor(s)) 1002, one or more memory devices 1004 (generically referred to herein as memory 1004), one or more input/output ("I/O") interface(s) 1006, one or more network interfaces 1008, one or more sensors or sensor interfaces 1010, and data storage 1014. The device 1000 may further include one or more buses 1012 that functionally couple various components of the device 1000. In certain example embodiments, the device 1000 may be a mobile device that may include one or more antennas (not shown) including, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1012 may include at least one of a system bus, a memory bus, an address bus, or a message bus, and may permit exchange of information (e.g., data (including computer-executable code), signaling, etc.) between various components of the device 1000. The bus(es) 1012 may include, without limitation, a memory bus or a memory controller, a peripheral bus, an accelerated graphics port, and so forth. The bus(es) 1012 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1004 of the device 1000 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1014 may include removable storage and/or non-removable storage including, but not limited to, magnetic storage, optical disk storage, solid-state storage, and/or tape storage. The data storage 1014 may provide non-volatile storage of computer-executable instructions and other data. The memory 1004 and the data storage 1014, removable and/or non-removable, are examples of computer-readable storage media (CRSM) as that term is used herein.

The data storage 1014 may store computer-executable code, instructions, or the like that may be loadable into the memory 1004 and executable by the processor(s) 1002 to cause the processor(s) 1002 to perform or initiate various operations. The data storage 1014 may additionally store data that may be copied to memory 1004 for use by the processor(s) 1002 during the execution of the computer-executable instructions. Moreover, output data generated as a result of execution of the computer-executable instructions by the processor(s) 1002 may be stored initially in memory 1004, and may ultimately be copied to data storage 1014 for non-volatile storage.

More specifically, the data storage 1014 may store one or more operating systems (O/S) 1016; one or more database management systems (DBMS) 1018; and one or more program modules, applications, or the like such as, for example, one or more application profile generation modules 1020, one or more application performance status determination modules 1022, one or more application icon sorting modules 1024, and one or more rendering modules 1026. Each of the program modules depicted in FIG. 10 may support any of the functionality described earlier in connection with similarly named modules. The data storage 1014 may further store any of a variety of other types of modules. Further, any program modules stored in the data storage 1014 may include one or more sub-modules. Further, any data stored in the data storage 1014 may be loaded into the memory 1004 for use by the processor(s) 1002 in executing computer-executable code. In addition, any data potentially stored in one or more datastores 1028 (e.g., device-specific data 1030, aggregate device data 1032, application performance status data 1034, application icon sorting data 1036) may be accessed via the DBMS 1018 and loaded in the memory 1004 for use by the processor(s) 1002 in executing computer-executable code.

The processor(s) 1002 may be configured to access the memory 1004 and execute computer-executable instructions loaded therein. For example, the processor(s) 1002 may be configured to execute computer-executable instructions of the various program modules of the device 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to other illustrative components depicted as being stored in the data storage 1014, the O/S 1016 may be loaded from the data storage 1014 into the memory 1004 and may provide an interface between other application software executing on the device 1000 and hardware resources of the device 1000. More specifically, the O/S 1016 may include a set of computer-executable instructions for managing hardware resources of the device 1000 and for providing common services to other application programs (e.g., managing memory allocation among various application programs). The O/S 1016 may include any operating system now known or which may be developed in the future including, but not limited to, any server operating system, any mainframe operating system, or any other proprietary or non-proprietary operating system.

The DBMS 1018 may be loaded into the memory 1004 and may support functionality for accessing, retrieving, storing, and/or manipulating data stored in the memory 1004, data stored in the data storage 1014, and/or data stored in the one or more datastores 1032. The DBMS 1018 may use any of a variety of database models (e.g., relational model, object model, etc.) and may support any of a variety of query languages. The DBMS 1018 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the device 1000 is a mobile device, the DBMS 1018 may be any suitable light-weight DBMS optimized for performance on a mobile device. It should be appreciated that "data," as that term is used herein, may include computer-executable instructions, code, or the like.

Referring now to other illustrative components of the device 1000, the one or more input/output (I/O) interfaces 1006 may facilitate the receipt of input information by the device 1000 from one or more I/O devices as well as the output of information from the device 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), FireWire, Thunderbolt, Ethernet port or other connection protocol that may connect to one or more networks. The I/O interface(s) 1006 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The device 1000 may further include one or more network interfaces 1008 via which the device 1000 may communicate with any of a variety of other systems, platforms, networks, devices, and so forth. Such communication may occur via one or more networks including any of the types of networks and communication media described earlier.

The sensor(s)/sensor interface(s) 1010 may include or may be capable of interfacing with any suitable type of sensing device such as, for example, ambient light sensors, inertial sensors, force sensors, thermal sensors, image sensors, magnetometers, and so forth. Example types of inertial sensors may include accelerometers (e.g., MEMS-based accelerometers), gyroscopes, and so forth.

The device 1000 may be provided with antenna(s) (not shown), which may include any suitable type of antenna depending, for example, on the communications protocols used to transmit or receive signals via the antenna(s). Non-limiting examples of suitable antennas may include directional antennas, non-directional antennas, dipole antennas, folded dipole antennas, patch antennas, multiple-input multiple-output (MIMO) antennas, or the like. The antenna(s) may be communicatively coupled to one or more transceivers or radio components (not shown) to which or from which signals may be transmitted or received.

It should be appreciated that the program modules, applications, computer-executable instructions, code, or the like depicted in FIG. 10 as being stored in the data storage 1014 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 1000, and/or hosted on other computing device(s) accessible via one or more networks, may be provided to support functionality provided by the program modules, applications, or computer-executable code depicted in FIG. 10 and/or additional or alternate functionality. Further, functionality may be modularized differently such that processing described as being supported collectively by the collection of program modules depicted in FIG. 10 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 10 may be implemented, at least partially, in hardware and/or firmware across any number of devices.

It should further be appreciated that the device 1000 may include alternate and/or additional hardware, software, or firmware components beyond those described or depicted without departing from the scope of the disclosure. More particularly, it should be appreciated that software, firmware, or hardware components depicted as forming part of the device 1000 are merely illustrative and that some components may not be present or additional components may be provided in various embodiments. While various illustrative program modules have been depicted and described as software modules stored in data storage 1014, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods 700-900 may have been described above as being performed by one or more components of the device 1000, or more specifically, by one or more one or more program modules executing on such a device 1000. It should be appreciated, however, that any of the operations of methods 700-900 may be performed, at least in part, in a distributed manner by one or more other devices or systems, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of any of the methods 700-900 may be described in the context of the illustrative device 1000, it should be appreciated that such operations may be implemented in connection with numerous other system configurations.

The operations described and depicted in the illustrative methods of FIGS. 7-9 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 7-9 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
determining presence of a content streaming application executable on a mobile device;
determining, during a first time period, a first signal strength of a WiFi connection between the mobile device and a wireless access point;
determining that the first signal strength of the WiFi connection meets or exceeds a threshold signal strength;
determining, based at least in part on the first signal strength, that an application icon associated with the content streaming application is to be rendered at a first position on a display of the mobile device;
determining, during a second time period, a second signal strength of the WiFi connection;
determining that the second signal strength of the WiFi connection is below the threshold signal strength;
determining, based at least in part on the second signal strength, that the application icon is to be rendered at a second position, wherein the first position is associated with a higher priority than the second position; and
rendering the application icon at the second position on the display of the mobile device.

2. The method of claim 1, further comprising prior to rendering the application icon at the second position:
determining, during the second time period, an amount of random access memory (RAM) required by the content streaming application to stream the content; and
determining, during the second time period, that the amount of RAM exceeds an amount of available RAM on the mobile device.

3. The method of claim 2, further comprising:
generating a first graphical indicator representing a first content streaming rate associated with the content streaming application;
generating a second graphical indicator representing a second content streaming rate;
determining, during a third time period, a third signal strength of the WiFi connection;
determining that the third signal strength is below the threshold signal strength;
determining, during the third time period, that the amount of RAM does not exceed the amount of available RAM on the mobile device;
ceasing rendering of the second graphical indicator on the display of the mobile device; and
rendering, on the display of the mobile device, a third graphical indicator in proximity to the application icon, the third graphical indicator indicating that the content streaming application can currently be used to stream the content at a third content streaming rate that is less than the first content streaming rate and greater that the second content streaming rate.

4. A method, comprising:
determining, by a device, an application performance parameter associated with an application executable on the device;
determining, by the device, a current value for the application performance parameter;
determining, by the device, that the current value for the application performance parameter is below a threshold value;
determining a current performance level of the application based at least in part on determining that the current value for the application performance parameter is below the threshold value, the current performance level being one of a plurality of performance levels for the application;
determining, based at least in part on the current performance level of the application, that an application icon associated with the application is to be rendered at a first position on a display of the device;
determining that the current performance level of the application has changed from a first performance level to a second performance level of the plurality of performance levels;
determining that the application icon is to be rendered at a second position, wherein the first position is associated with a higher priority than the second position; and
rendering the application icon at the second position on the display.

5. The method of claim 4, wherein the application performance parameter is a first application performance parameter, the method further comprising:
determining, by the device, a second application performance parameter associated with the application; and
determining, by the device, a current value for the second application performance parameter;
wherein determining the current performance level of the application comprises determining the current performance level further based at least in part on the current value for the second application performance parameter.

6. The method of claim 5, wherein the threshold value is a first threshold value, the method further comprising:
determining, by the device, that the current value for the second application performance parameter is less than a second threshold value,
wherein determining the current performance level of the application comprises determining that the current performance level is a lowest performance level of the plurality of performance levels.

7. The method of claim 5, wherein the threshold value is a first threshold value, the method further comprising:
determining, by the device, that the current value for the second application performance parameter meets or exceeds a second threshold value, wherein determining the current performance level of the application comprises determining that the current performance level is an intermediate performance level of the plurality of performance levels.

8. The method of claim 4, further comprising:
detecting, at the device, a touch event associated with the application icon; and
rendering, on the display of the device, performance information associated with the application, the performance information including text indicative of the current performance level of the application.

9. The method of claim 4, the method further comprising:
determining that the current performance level of the application has changed from the second performance level to a third performance level of the plurality of performance levels, the third performance level being higher than the second performance level;
determining that the application icon is to be rendered at a third position, wherein the third position is associated with a higher priority than the second position; and
rendering the application icon at the third position on the display.

10. The method of claim 4, further comprising:
determining, by the device, a performance score for the application based at least in part on the current value of the application performance parameter; and
outputting an indication of the performance score on the display.

11. The method of claim 4, wherein the application performance parameter relates to one of: network connectivity of the device, memory usage of the application, processing unit usage of the application, battery usage of the application, or a signal strength of a Global Positioning System (GPS) signal received by the device.

12. The method of claim 4, wherein determining the application performance parameter associated with the application comprises determining that the application uses network connectivity to enable functionality of the application, and wherein determining the current value for the application performance parameter comprises determining a network latency of a network connection between the device and a remote server.

13. The method of claim 4, further comprising:
disabling, by the device, the application while the application is associated with the current performance level, wherein disabling the application comprises rendering a non-selectable application icon associated with the application on a display of the device.

14. The method of claim 4, further comprising:
detecting a gesture that causes a movement of the application icon; and
causing the application icon and an indicator to move.

15. A device, comprising:
a display;
at least one memory storing computer-executable instructions; and
at least one processor operatively coupled to the display and the at least one memory, wherein the at least one processor is configured to access the at least one memory and execute the computer-executable instructions to:
determine first historical application usage data associated with the device, the first historical application usage data indicating at least one of: i) a first device location associated with launching of a first application on the device, ii) a first time period associated with launching of the first application on the device, or iii) a first usage frequency of the first application;
determine second historical application usage data associated with the device, the second historical application usage data indicating at least one of: i) a second device location associated with launching of a second application on the device, ii) a second time period associated with launching of the second application on the device, or iii) a second usage frequency of the second application;
determine that one or more conditions are satisfied;
determine, using the first historical application usage data and the second historical application usage data, a sorting order indicative of an order in which a first application icon representative of the first application and a second application icon representative of the second application are to be rendered on a display of the device;
determine, based at least in part on current performance level of the application, that the first application icon is to be rendered at a first position on the display;
determine that the current performance level of the first application has changed from a first performance level to a second performance level;
determine that the first application icon is to be rendered at a second position, wherein the first position is associated with a higher priority than the second position; and
render the first application at the second position.

16. The device of claim 15, wherein the at least one processor is configured to determine that the one or more conditions are satisfied by executing the computer-executable instructions to determine that a current location of the device corresponds to first device location, and wherein the at least one processor is configured to determine the sorting order by executing the computer-executable instructions to determine that the first application icon is to be rendered on the display of the device at the first position and that the second application icon is to be rendered on the display of the device at the second position.

17. The device of claim 16, wherein the at least one processor is further configured to execute the computer-executable instructions to:
determine that functionality associated with a third application relates to the first device location; and
determine that a third application icon representative of the third application is to be rendered on the display of the device at a third position, the third position being associated with a third priority in the sorting order, the third priority being higher a second priority associated with the second position and less than a first priority associated with the first position.

18. The device of claim 15, wherein the at least one processor is configured to determine that the one or more conditions are satisfied by executing the computer-executable instructions to determine that a current time corresponds to the first time period, and wherein the at least one processor is configured to determine the sorting order by executing the computer-executable instructions to determine that the first application icon is to be rendered on the display of the device at the first position and that the second application icon is to be rendered on the display of the device at the second position.

19. The device of claim 15, wherein the at least one processor is further configured to execute the computer-executable instructions to:

determine, based at least in part on the first usage frequency and the second usage frequency, that the first application was launched a greater number of times or executed for a longer duration than the second application during a historical time period;

determine that the first application icon is to be rendered on a home screen panel; and determine that the second application icon is to be rendered on a secondary screen panel accessible from the home screen panel.

\* \* \* \* \*